United States Patent
Matsushita et al.

(10) Patent No.: US 8,042,418 B2
(45) Date of Patent: Oct. 25, 2011

(54) DOUBLE-CLUTCH TRANSMISSION

(75) Inventors: Masahiro Matsushita, Okazaki (JP);
Katsuhiro Komori, Okazaki (JP);
Takao Kimura, Nishikamo-gun (JP)

(73) Assignee: Mitsubishi Jidosha Kogyo Kabushiki Kaisha, Aichi (JP)

( * ) Notice: Subject to any disclaimer, the term of this patent is extended or adjusted under 35 U.S.C. 154(b) by 678 days.

(21) Appl. No.: 12/054,832

(22) Filed: Mar. 25, 2008

(65) Prior Publication Data

US 2008/0236317 A1 Oct. 2, 2008

(30) Foreign Application Priority Data

Mar. 26, 2007 (JP) ................... 2007-080256

(51) Int. Cl.
*F16H 3/08* (2006.01)
(52) U.S. Cl. ................ 74/330; 74/333; 74/340
(58) Field of Classification Search .............. 74/330, 74/333, 340
See application file for complete search history.

(56) References Cited

U.S. PATENT DOCUMENTS

| 6,090,008 A * | 7/2000 | Hoshiya et al. | 477/84 |
| 2006/0037422 A1* | 2/2006 | Kuhstrebe et al. | 74/340 |
| 2007/0199397 A1* | 8/2007 | Maten et al. | 74/340 |
| 2007/0214906 A1* | 9/2007 | Fahland et al. | 74/340 |
| 2009/0138162 A1* | 5/2009 | Futamura | 701/55 |

FOREIGN PATENT DOCUMENTS

| JP | 2006-52832 A | 2/2006 |
| WO | WO-2006/032418 A2 | 3/2006 |
| WO | WO-2006/032418 A3 | 3/2006 |

* cited by examiner

*Primary Examiner* — Ha D. Ho
(74) *Attorney, Agent, or Firm* — Birch, Stewart, Kolasch & Birch, LLP

(57) ABSTRACT

In a double-clutch transmission, a clutch of an input shaft which is not synchronously rotated with a output shaft is connected to synchronize the speed of rotation of the input shaft with that of the engine, and the rotational speed of the input shaft is measured to thereby detect a engine rotational speed.

5 Claims, 3 Drawing Sheets

DOUBLE-CLUTCH TRANSMISSION

CROSS-REFERENCE TO RELATED APPLICATIONS

This application is based upon and claims the benefit of priority from prior Japanese Patent Application No. 2007-080256, filed Mar. 26, 2007, the entire contents of which are incorporated herein by reference.

BACKGROUND OF THE INVENTION

1. Field of the Invention

The present Invention relates to a double-clutch transmission which enables continuous shift transmission by a synchromesh mechanism with interruption of power transmission suppressed to a minimum by use of two clutches and two input shafts.

2. Description of the Related Art

As an automatic transmission of a vehicle, there is a double-clutch transmission. For the double-clutch transmission, for example, a constantly meshing gear mechanism in which a drive gear and a driven gear constantly engage with each other is used, which suppresses loss of power transmission during shift transmission.

For the structure of this double-clutch transmission, a structure that combines an input system using two clutches and two input shafts having drive gears with an output system using two output shafts having driven gears and a synchromesh mechanism is adopted.

Specifically, in the input system, for example, a plurality of advance shift levels are divided into shift level groups of an even number of shift levels and an odd number of shift levels. Each drive gear of the odd-number shift level group is installed to one of the first and second input shafts connected to a clutch, respectively. Each drive gear of the even-number shift level group is installed to the other input shaft. The rotational force of the engine is transmitted to the first and second input shafts via each clutch.

For the output system, there is used a structure to distribute each driven gear that meshes with each drive gear and a synchromesh mechanism that transmits the rotational force to each driven gear to the first and second output shafts installed in parallel to the first and second input shafts.

According to the above-mentioned input system and output system, for example, after the shift of the odd-number transmission shift level is finished, while the engine rotation to be input from the clutch to the first input shaft, that is, the motive force, is being generated from one output shaft, the drive gear of the subsequent even-number transmission shift level is synchronized with the other output shaft by the synchromesh mechanism to get ready for the gearshift operation of the subsequent shift level.

Consequently, when a gear is shifted in the subsequent shift level, the first input shaft is disconnected from the engine output shaft, and a clutch that connects the second input shaft to the engine output shaft is operated to connect them to change over to the shift level group that utilizes the second input shaft; then, immediately, the gear is shifted to the subsequent even-number shift level.

Then, when a gear is changed to the odd-number shift level, allowing the shift level of the first input shaft to get ready for the gearshift operation in the same manner as described above while the engine rotational force is being transmitted through the second input shaft can complete the gearshift operation to the subsequent odd-number shift level by changing over both clutches. Therefore, a loss of motive force transmission can be suppressed in the gearshift operation from a low-speed gearshift level to a high-speed gearshift level, for example, for first to sixth gear speeds.

This kind of technology is disclosed in Jpn. Pat. Appln. KOKAI Publication No. 2006-52832.

Note that, in this kind of double-clutch transmission, for control of the clutch operation, sensors to measure the rotational speed of the first and second input shafts are installed. Specifically, two sensors, one sensor that measures the rotational speed of the first input shaft and the other sensor that measures the rotational speed of the second input shaft, are installed.

On the engine side, a sensor that detects the engine rotational speed is installed. On the double-clutch transmission side, information on the engine rotational speed is conveyed. The double-clutch transmission controls the operation of each clutch in accordance with the engine rotational speed and rotational speeds of the first and second input shafts.

On the other hand, when the information on the engine rotational speed is not conveyed to the double-clutch transmission because, for example, the sensor that measures the rotational speed on the engine side fails, the automobile enters a failed state.

When the automobile enters such state, the shift position is fixed to, for example, the third gear speed to enable the automobile to travel to a safe place.

However, in the case where the shift position is changed to the third gear speed under the conditions that the engine rotational speed is not known, or in the case where the engine rotational speed does not correspond to the third gear speed, cases in which the clutch is destroyed, etc. may be assumed. Consequently, to control each clutch, for example, an auxiliary sensor that detects the engine rotational speed is installed on the engine side. This auxiliary sensor measures the engine rotational speed and the measurement results are conveyed to the double-clutch transmission side.

However, in a structure to install auxiliary sensors on the engine side to achieve fail-safe as described above, sensors increase in number.

When the number of sensors increases, consideration must be given to cost increase and installation space, which is not desirable.

BRIEF SUMMARY OF THE INVENTION

It is an object of the present invention to provide a double-clutch transmission that can reduce the vehicle cost.

A double-clutch transmission of the present invention comprises: an input system; an output system; a first detection unit; and a second detection unit. The input system is provided with drive gears of a first gearshift level group of a plurality of gearshift levels divided into two groups, a first input shaft to which the drive gears of the first gearshift level group are installed, drive gears of the second gearshift level group, a second input shaft to which the drive gears of the second gearshift level group are installed, a first clutch which conveys the rotational force of an engine to the first input shaft, and a second clutch which conveys the rotational force of the engine to the second input shaft. The output system is provided with driven gears of a first gearshift level group engaged with the drive gears of the first gearshift level group, driven gears of the second gearshift level group engaged with the drive gears of the second gearshift level group, an output shaft to which the driven gears of the first gearshift level group and the driven gears of the second gearshift level group are rotatably supported, a first synchromesh mechanism which is installed to the output shaft, engages with the driven gears of the first gearshift level group, and achieves synchronous rotation between the first input shaft and the output shaft, and a second synchromesh mechanism which is installed to the output shaft, engages with the driven gears of the second gearshift level group, and achieves synchronous rotation between the second input shaft and the output shaft. The first detection unit measures a rotational speed of the first input shaft. The second detection unit measures a rotational speed of the second input shaft. A clutch of the input shaft which is not synchronously rotated with the output shaft is connected to synchronize the speed of rotation of the input shaft with that of the engine, and the rotational speed of the input shaft is measured to thereby detect the engine rotational speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
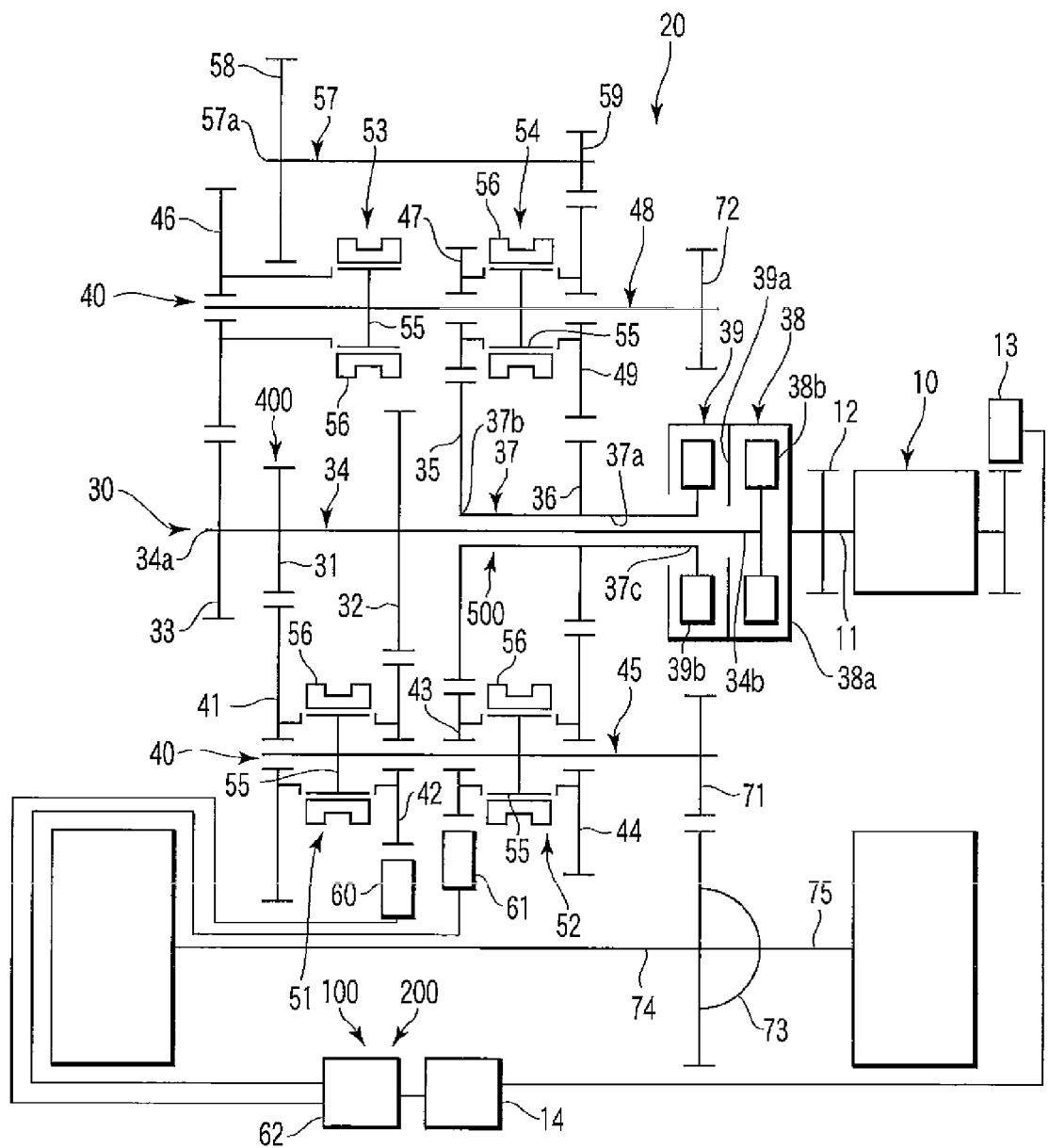
FIG. 1 is a schematic block diagram of a double-clutch transmission according to a first embodiment of the invention.
Figure 2:
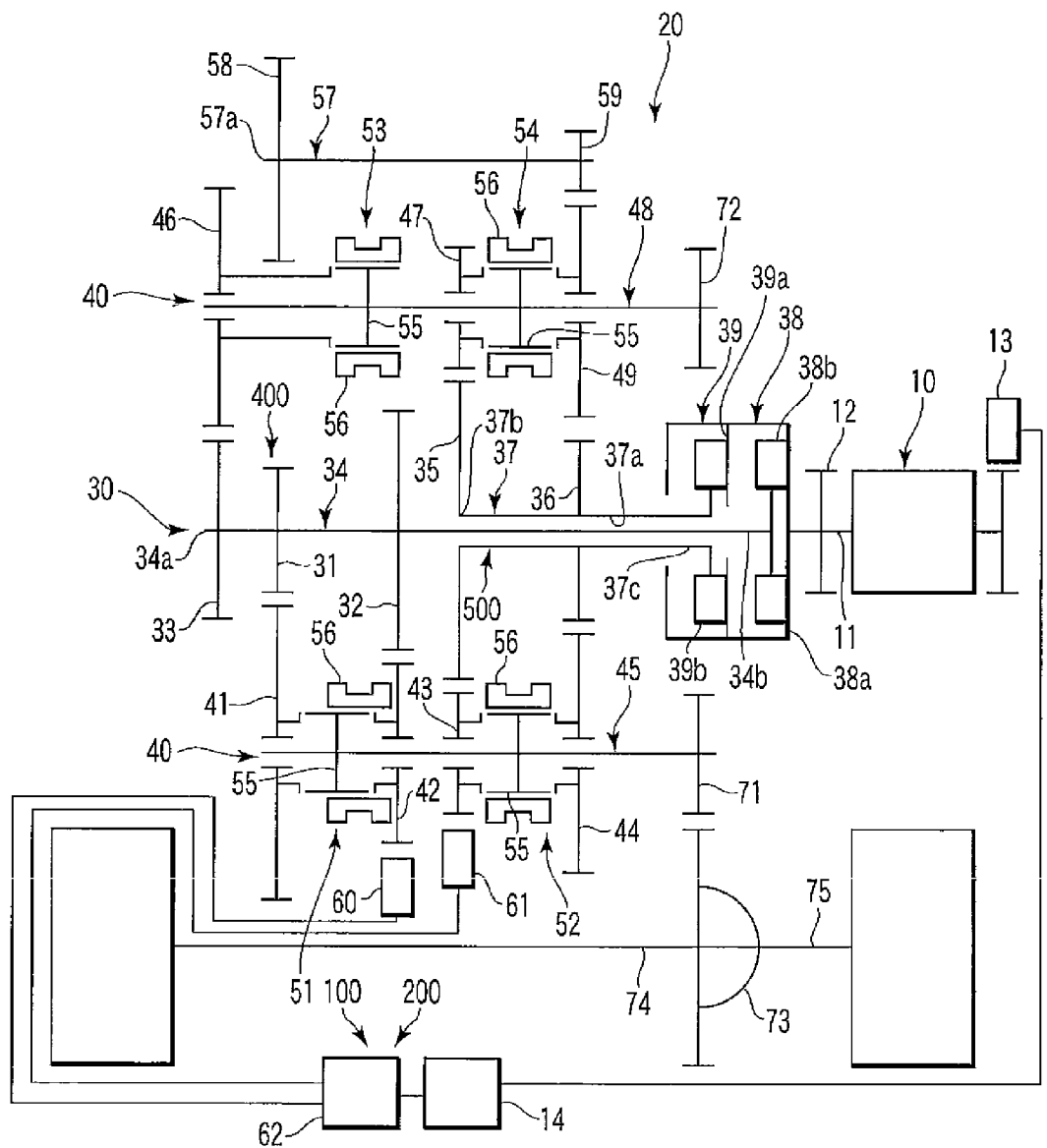
FIG. 2 is a schematic block diagram that shows the double-clutch transmission shown in FIG. 1 when an automobile enters a fail state while it is forward-traveling.
Figure 3:
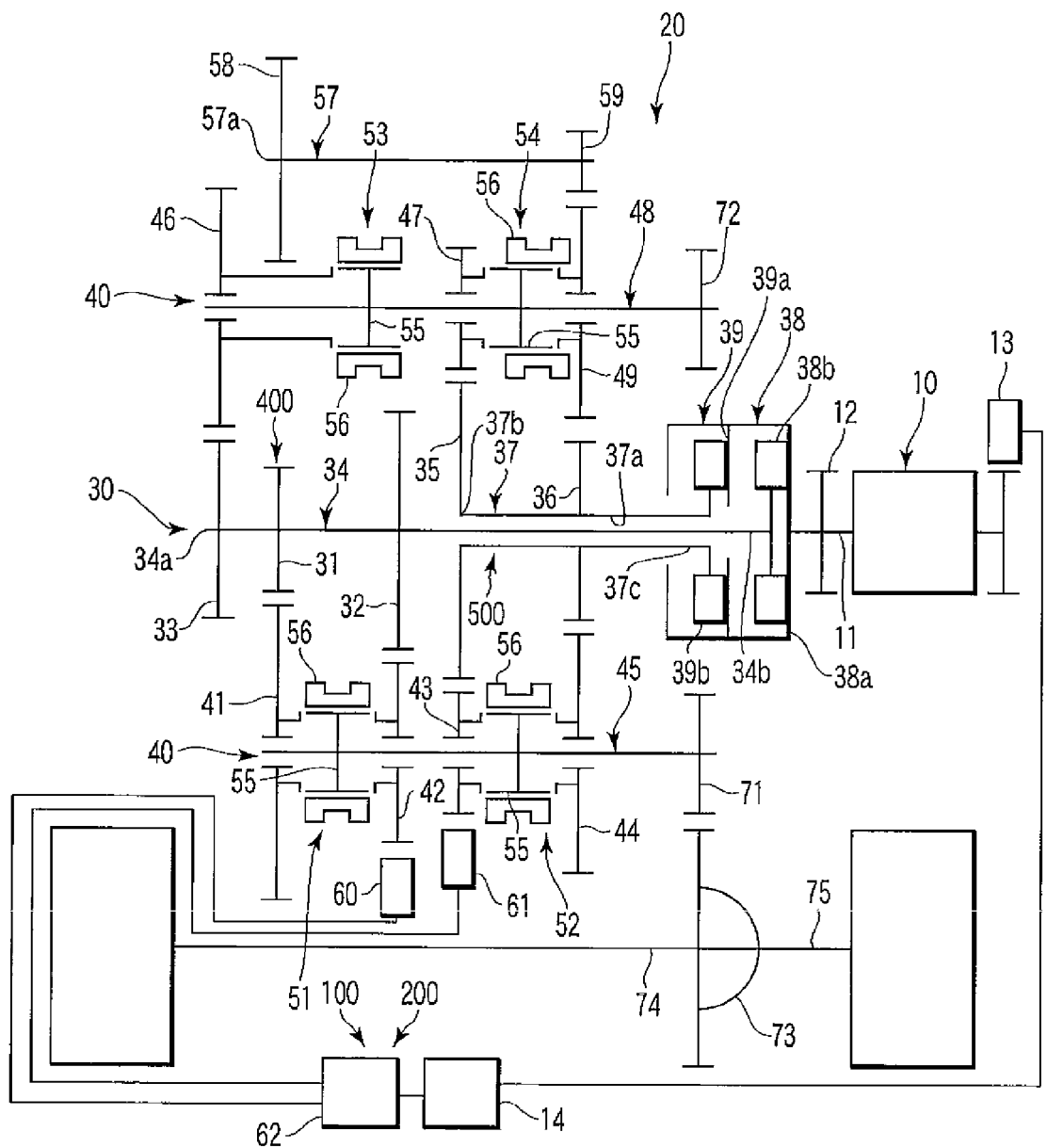
FIG. 3 is a schematic block diagram that shows the double-clutch transmission shown in FIG. 1 when an automobile enters a fail state while it is backward-traveling.

Referring now to FIGS. 1 to 3, a double-clutch transmission 20 according to one embodiment of the present invention will be described. FIG. 1 is a schematic block diagram of the double-clutch transmission 20. As shown in FIG. 1, the double-clutch transmission 20 is connected to an engine 10, and rotation of the engine 10, that is, motive power, is conveyed to the double-clutch transmission 20.

A flywheel 12 is mounted to an output shaft 11 of the engine 10. In addition, a crank angle sensor 13 which measures the engine rotational speed is installed to the engine 10. The crank angle sensor 13 is connected to an engine ECU (Electronic Control Unit) 14. The rotational speed information of the engine 10 measured by the crank angle sensor 13 is conveyed to the engine ECU 14. Note that the engine 10 and the double-clutch transmission 20 are mounted on, for example, an automobile (not illustrated).

The double-clutch transmission 20 is provided with an input system 30, an output system 40, a first sensor 60, a second sensor 61, and a transmission ECU 62.

The input system 30 is provided with drive gears 31, 32, and 33 of a plurality of odd-number gearshift levels, a first input shaft 34 to which the drive gears 31 through 33 of these odd-number gearshift levels are installed, drive gears 35 and 36 of a plurality of even-number gearshift levels, a second input shaft 37 to which the drive gears 35 and 36 of these even-number gearshift levels are installed, a first clutch 38, and a second clutch 39. The plurality of odd-number gearshift levels configures an odd-number gearshift group 400. The plurality of odd-number gearshift levels, in other words, the odd-number gearshift group 400 is an example of a first gearshift group in the invention. The plurality of even-number gearshift levels configures an even-number gearshift group 500. The plurality of even-number gearshift levels, in other words, the even-number gearshift group 500 is an example of a second gearshift group in the invention.

The output system 40 is provided with driven gears 41, 42, 43, and 44 of a plurality of gearshift levels, a first output shaft 45 to which these driven gears 41 through 44 are mounted, a plurality of driven gears 46, 47, and 49, a second output shaft 48 to which these driven gears 46, 47 and 49 are installed, and a plurality of synchromesh mechanisms 51 through 54 which convey rotation of the engine 10, that is, motive power to each of the driven gears 41 through 44, 46, 47 and 49 that correspond to each of the above-mentioned drive gears 31, 32, 33, 35 and 36. The driven gears 41 and 42 are one example of driven gears of the first gearshift group in the invention, the driven gears 43 and 44 are one example of driven gears of the second gearshift group in the invention, the synchromesh mechanism 51 is one example of a first synchromesh mechanism in the invention, and the synchromesh mechanism 52 is one example of a second synchromesh mechanism in the invention.

The structure of the input system 30 will be specifically described. To the first input shaft 34, the drive gear 31 used for both first gear speed and reverse, the drive gear 32 for the third gear speed, and the drive gear 33 for the fifth gear speed are installed. These are installed integrally in the range from one end 34a to the vicinity of the midslope of the first input shaft 34 in order of drive gears 33, 31, and 32 from the one end 34a side. The drive gears 31 through 33 rotate integrally with the first input shaft 34.

The second input shaft 37 is composed of a hollow shaft member through which the first input shaft 34 is allowed to pass. On the inner side of the second input shaft 37, a housing hole 37a is formed, which rotatably houses the first input shaft 34 around the central axis. The housing hole 37a passes through the second input shaft 37 in the axial direction. The first input shaft 34 is housed in the housing hole 37a in a posture with the axial direction aligned in the axial direction of the second input shaft 37. The second input shaft 37 covers the range from the other end 34b side of the first input shaft 34 to the vicinity of the upper half.

To the second input shaft 37, a drive gear 35 for the forth gear speed and for the sixth gear speed and a drive gear 36 for the second gear speed are installed. These are integrally fixed in order of the drive gear 35 and the drive gear 36 from one side 37b of the second input shaft 37. The drive gears 35 and 36 rotate integrally with the second input shaft 37.

The first clutch 38 is mounted to the other end 34b of the first input shaft 34. The first clutch 38 is provided with a first pressure plate 38a and a first clutch disk 38b.

The first pressure plate 38a is fixed to the output shaft 11 of the engine 10 and rotates together with the output shaft 11 of the engine 10. The first clutch disk 38b is fixed to the other end 34b of the first input shaft 34. As the first pressure plate 38a moves, the relevant first pressure plate 38a comes in contact with the first clutch disk 38b, and thus rotation of the engine 10, that is, motive force, is conveyed to the first input shaft 34 via the first clutch 38.

The second clutch 39 is installed to the other end 37c of the second input shaft 37. The second clutch 39 is provided with a second pressure plate 39a and a second clutch disk 39b.

The second pressure plate 39a is fixed to the output shaft 11 of the engine 10 and rotates together with the output shaft 11. The second clutch disk 39b is fixed to the other end 37c of the second input shaft 37. As the second pressure plate 39a moves, the relevant second pressure plate 39a comes in contact with the second clutch disk 39b, and thus rotation of the engine 10, that is, motive force, is conveyed to the second input shaft 37 via the second clutch 39.

The output system 40 will be specifically described. The first output shaft 45 is arranged side by side in parallel with the first and second input shafts 34 and 37. To the first output shaft 45, the driven gear 41 for the first gear speed, driven gear 42 for the third gear speed, driven gear 43 for the fourth gear speed, and driven gear 44 for the second gear speed are installed. These driven gears 41 through 44 are rotatably supported around the first output shaft 45.

The driven gear 41 meshes with the drive gear 31 installed to the first input shaft 34 and rotates together with the drive gear 31. The driven gear 42 meshes with the drive gear 32 installed to the first input shaft 34 and rotates together with the drive gear 32. The driven gear 43 meshes with the drive gear 35 installed to the second input shaft 37 and rotates together with the drive gear 35. The driven gear 44 meshes with the drive gear 36 installed to the second input shaft 37 and rotates together with the drive gear 36.

The synchromesh mechanisms 51 and 52 are of, for example, a synchronous meshing type and are mounted to the first output shaft 45. The synchromesh mechanism 51 has two shift directions and is assigned for the first gear speed and the third gear speed. The synchromesh mechanism 52 has two shift directions and is assigned for the second gear speed and the fourth gear speed.

The structure of the synchromesh mechanism 52 may be the same as that of the synchromesh mechanism 51 and thus the structure of the synchromesh mechanism 51 will be described as a representative.

The synchromesh mechanism 51 is provided with a synchronizer hub 55 and a synchronizer sleeve 56. The synchronizer hub 55 is fixed between the driven gear 41 and the driven gear 42 in the first output shaft 45, and is rotated together with the first output shaft 45. In the case of the synchromesh mechanism 52, the synchronizer hub 55 is fixed between the driven gear 43 and the driven gear 44.

The synchronizer sleeve 56 is movably assembled to the driven gear 41 side and the driven gear 42 side along the first output shaft 45 on the outer circumferential portion of the synchronizer hub 55. In the case of the synchromesh mechanism 52, the synchronizer sleeve 56 is movable to the driven gear 43 side and the driven gear 44 side.

Synchronizer cones are formed in the driven gears 41 through 44. In addition, on the cone surfaces of the synchronizer cones, synchronizer rings are disposed so as to cover the cone surfaces.

The synchromesh mechanisms 51 and 52 have the synchronizer ring brought in contact with the cone surface of the synchronizer cone when the synchronizer sleeve 56 is moved in any of the directions along the first output shaft 45 (to any of the sides of the driven gears 41, 42, 43, or 44). Due to the friction involved, the rotational difference between the driven gears 41 through 44 and the synchronizer sleeve 56 is reduced and at the same time, rotations of the driven gears 41 through 44 are synchronized with the rotation of the first output shaft 45.

The second output shaft 48 is arranged side by side in parallel with the first and second input shafts 34 and 37. To the second output shaft 48, the driven gear 46 for the fifth gear speed, driven gear 47 for the sixth gear speed, and driven gear 49 for reverse are installed. These driven gears 46, 47, and 49 are rotatably supported around the second output shaft 48.

The driven gear 46 meshes with the drive gear 33 installed to the first input shaft 34 and rotates together with the drive gear 33. The driven gear 47 meshes with the drive gear 35 installed to the second input shaft 37 and rotates together with the drive gear 35.

In addition, a transmission shaft 57 is disposed in the vicinity of the second output shaft 48. The transmission shaft 57 is parallel to the second output shaft 48. To one end 57a of the transmission shaft 57, a gear 58 that meshes with the drive gear 31 installed to the first input shaft 34 is installed. The gear 58 rotates integrally with the transmission shaft 57. In addition, a gear 59 that meshes with the driven gear 49 for reverse is installed. By this structure, the driven gear 49 for reverse receives the rotation of the drive gear 31 transmitted via the transmission shaft 57.

The synchromesh mechanism 53 is used for selecting the fifth gear speed. The structure of the synchromesh mechanism 53 may be nearly the same as that of the synchromesh mechanism 51 and thus the detailed description thereof will be omitted.

In the case of the synchromesh mechanism 53, the synchronizer hub 55 is fixed between the driven gear 46 and the driven gear 47 at the second output shaft 48, and rotates together with the second output shaft 48. The synchronizer sleeve 56 is movably assembled to the driven gear 46 side along the second output shaft 48.

In the synchromesh mechanism 53, the synchronizer ring is brought into contact with the cone surface of the synchronizer cone by the foregoing structure, when the synchronizer sleeve 56 is moved to the driven gear 46 side along the second output shaft 48. By the friction in such event, a rotation difference between the driven gear 46 and the synchronizer sleeve 56 is reduced and at the same time, the rotation of the driven gear 46 is synchronized with the rotation of the second output shaft 48.

The synchromesh mechanism 54 is, for example, of a synchronous meshing type and is mounted to the second output shaft 48. The synchromesh mechanism 54 has two shift directions and is assigned for the sixth gear speed and reverse selection. The synchromesh mechanism 54 is the second synchromesh mechanism in the present invention. Note that, the structure of the synchromesh mechanism 54 may be nearly the same as that of the synchromesh mechanism 51 and thus detailed description thereof is omitted.

In the case of the synchromesh mechanism 54, the synchronizer hub 55 is fixed between the driven gear 47 and the driven gear 49. The synchronizer sleeve 56 is movable to the driven gear 47 side and the driven gear 49 side.

By the foregoing structure, the synchromesh mechanism 54 transmits the rotation of the first input shaft 34 transmitted via the transmission shaft 57 to the second output shaft 48 when the driven gear 49 for reverse is selected. That is, by the synchromesh mechanism 54, the rotation of the first input shaft 34 is indirectly transmitted to the second output shaft 48.

In addition, output gears 71 and 72 are installed to the ends on the sides of the first and second clutches 38 and 39 of the first and second output shafts 45 and 48. The output gears 71 and 72 mesh with a differential mechanism 73.

The first sensor 60 is disposed in the vicinity of the driven gear 42 for the third gear speed installed to the first output shaft 45 and measures the rotational speed of the driven gear 42. The second sensor 61 is disposed in the vicinity of the driven gear 43 for the fourth gear speed installed to the first output shaft 45 and measures the rotational speed of the driven gear 43.

The transmission ECU 62 is connected to the first and second sensors 60 and 61. The transmission ECU 62 detects the rotational speed of the first input shaft 34 from the rotational speed of the driven gear 42 measured by the first sensor 60. Similarly, the transmission ECU 62 detects the rotational speed of the second input shaft 37 from the rotational speed of the driven gear 43 measured by the second sensor 61.

The first sensor 60 and the transmission ECU 62 configure a first detection unit 100. The first detection unit 100 is one example of a first detection unit in the present invention. The second sensor 61 and the transmission ECU 62 configure a second detection unit 200. The second detection unit 200 is one example of a second detection unit in the present invention.

In addition, the transmission ECU 62 is connected to the engine ECU 14 and the rotational speed information of the engine 10 measured by the crank angle sensor 13 is transmitted to the transmission ECU 62.

The transmission ECU 62 takes into account the rotational speed information of the first and second input shafts 34 and 37 and the rotational speed information of the engine 10, and controls action between the first and second clutches 38 and 39 and the synchromesh mechanisms 51 through 54, etc. Specifically, by an actuator (not illustrated) which is controlled by instructions of the transmission ECU 62, action of the first and second clutches 38 and 39 and the synchromesh mechanisms 51 through 54 is conducted. The transmission ECU 62 is one example of a control unit in the present application.

Next, discussion will be made on the action of the double-clutch transmission 20. When shifting to the first gear speed, first of all, by an actuator that is activated by shift transmission instructions output from the transmission ECU 62, the synchronizer sleeve 56 of the synchromesh mechanism 51 slides to the first gear speed side to allow the driven gear 41 for the first gear speed to mesh with the first output shaft 45. As a result, the gear shift level of the first gear speed is selected. Thereafter, by an actuator that is activated by gearshift instructions of the transmission ECU 62, the first clutch 38 is activated to be connected.

As a result, rotation of the engine 10, that is, motive power is transmitted to the first input shaft 34, drive gear 31 for the first gear speed, driven gear 41 for the first gear speed, and first output shaft 45, and shift transmission thereby takes place. Then, the gear-shifted rotation is output from the output gear 71 to the differential mechanism 73, transmitted to right and left axles 74 and 75, and an automobile is driven at the first gear speed. Note that, in such event, the second clutch 39 is not activated to be connected and therefore, rotation of the engine 10, that is, motive power is not transmitted to the second input shaft 37.

When a gearshift instruction to the second gear speed is output while an automobile is traveling at the first gear speed, the synchronizer sleeve 56 of the synchromesh mechanism 52 slides to the second gear speed side while the first clutch 38 is in the connected state and at the same time the second clutch 39 is in the disconnected state, and the driven gear 44 for the second gear speed is engaged with the first output shaft 45.

This completes preparation of the gearshift operation to the second gear speed. Thereafter, while connection of the first clutch 38 is being released by the instruction of the transmission ECU 62, the second clutch 39 is connected based on the engine rotational speed measured by the crank angle sensor 13 and the rotational speed of the second input shaft 37 measured by the second sensor 61. Consequently, rotation from the engine 10, that is, motive power transmission is changed over from the first input shaft 34 to the second input shaft 37.

Then, the output of the engine 10 is gear-shifted by being transmitted to the second input shaft 37, drive gear 36 for the second gear speed, driven gear 44 for the second gear speed, and first output shaft 45. The gear-shifted rotation is output from the output gear 71 to the differential mechanism 73. By this change-over to the second gear speed, the automobile is instantaneously changed over to travel at the second gear speed.

In the case where a gearshift instruction to the third gear speed is output while the automobile is traveling at the second gear speed, the synchronizer sleeve 56 of the synchromesh mechanism 51 slides to the third gear speed side while the first clutch 38 is in the disconnected state and the second clutch 39 is in the connected state, and the driven gear 42 for the third gear speed is engaged with the first output shaft 45.

This completes the preparation of the gearshift operation to the third gear speed. Thereafter, while connection of the second clutch 39 is being released, the first clutch 38 is connected based on the engine rotational speed measured by the crank angle sensor 13 and the rotational speed of the first input shaft 34 measured by the first sensor 60. Consequently, motive power transmission of the engine 10 is changed over from the second input shaft 37 to the first input shaft 34.

Then, the output of the engine 10 is gear-shifted by being transmitted to the first input shaft 34, drive gear 32 for the third gear speed, driven gear 42 for the third gear speed, and first output shaft 45. The gear-shifted rotation is output from the output gear 71 to the differential mechanism 73. By this change-over to the third gear speed, the automobile is instantaneously changed over to travel at the third gear speed.

Gearshift conversion of remaining fourth, fifth, sixth, and reverse gearshift levels is continuously conducted with the motive power loss suppressed to a minimum in the same manner as described above by the synchromesh mechanisms 51 through 54 and the first and second clutches 38 and 39 under the control of the transmission ECU 62.

Next, the action of the double-clutch transmission 20 in a fail state that occurs during advance travel of an automobile will be discussed.

In the case where rotational speed information of the engine 10 is not conveyed to the transmission ECU 62 while an automobile is traveling, for example, because the crank angle sensor 13 is broken, the rotational speed of the engine 10 is unable to be grasped and the automobile enters a fail state.

Under this kind of fail state, the automobile is allowed to move to a safe location by fixing the shift position to, for example, the third gear speed. When the shift position is not the third gear speed, the shift position is changed to the third gear speed under the control of the transmission ECU 62.

In such event, assume that the automobile is traveling, for example, at the fourth gear speed. With the shift position set to the fourth gear speed, the second clutch 39 is connected, and the first clutch 38 is not connected. Consequently, the second clutch 39 must be disconnected and the first clutch 38 must be connected, and thus the engine rotational speed must be measured. Therefore, the transmission ECU 62 allows the synchronizer sleeve 56 of the synchromesh mechanism 51 to slide to the third gear speed side, and allows the driven gear 42 for the third gear speed to engage with the first output shaft 45. Thereafter, the synchronizer sleeve 56 of the synchromesh mechanism 52 is moved to the intermediate position between the second gear speed and the fourth gear speed, that is, the neutral position, and engagement of the second input shaft 37 with the first output shaft 45 is released. Then, connecting the second clutch 39 allows the second input shaft 37 to rotate at the same rotational speed as that of the engine, and the rotational speed of the engine 10 can be detected based on the measurement results of the second sensor 61. That is, the rotational speed of the engine 10 is detected by the rotation of the second input shaft 37.

Simultaneously with this action, under the control of the transmission ECU 62, the synchromesh mechanism 51 synchronizes the driven gear 42 for the third gear speed with the first output shaft 45. When the driven gear 42 for the third gear speed is synchronized with the first output shaft 45, the transmission ECU 62 activates the first clutch 38 to connect with the detected rotational speed of the engine 10 taken into account. This changes the shift position to the third gear speed.

FIG. 2 is a schematic block diagram that shows the double-clutch transmission 20 in which the first and second clutches 38 and 39 are activated to be connected and whose shift position is set to the third gear speed.

As shown in FIG. 2, by measuring the rotational speed of the driven gear 43 for the fourth gear speed to be driven by the second input shaft 37, the rotational speed of the engine 10 can be detected.

Under this kind of fail state, the transmission ECU 62 detects the rotational speed of the first input shaft 34 by the rotational speed of the driven gear 42 for the third gear speed measured by the first sensor 60, and at the same time detects the rotational speed of the second input shaft 37 by the rotational speed of the driven gear 43 for the fourth gear speed measured by the second sensor 61, thereby detecting the rotational speed of the engine 10.

The transmission ECU 62 controls the action of the first clutch 38 based on the rotational speeds of the first input shaft 34 and the engine 10 detected as above.

Next, a description will be made on the action of the double-clutch transmission 20 in a fail state in which the rotational speed information of the engine 10 is not conveyed to the transmission ECU 62 when an automobile is being reversed.

While an automobile is being reversed, the first clutch 38 is operated to be connected and the second clutch 39 is not connected. When the rotational speed information of the engine 10 is not conveyed from the engine ECU 14 while the automobile is reversing, the transmission ECU 62 connects the second clutch 39 after making sure that the synchromesh mechanisms 52 and 54 are neutral, that is, they are not engaged with the first output shaft 45 or the second output shaft 48, and allows the second input shaft 37 to rotate at the same rotational speed as that of the engine, thereby detecting the rotational speed of the engine 10 from the rotation of the second input shaft 37.

FIG. 3 is a schematic block diagram that shows the double-clutch transmission 20 in which the first and second clutches 38 and 39 are activated to be connected and whose shift position is set to the reverse gear speed.

As shown in FIG. 3, the second sensor 61 measures the rotational speed of the driven gear 43 for the fourth gear speed which is driven by the second input shaft 37. The transmission ECU 62 detects the rotational speed of the second input shaft 37 based on the rotational speed of the driven gear 43 measured by the second sensor 61, and at the same time detects the rotational speed of the engine 10 from the relevant detection results. The transmission ECU 62 controls the connecting action of the first clutch 38 based on the rotational speed of the engine 10 detected as above.

In the double-clutch transmission 20 configured in this way, even at the time of any fail state in which rotational speed information of the engine 10 is not conveyed to the transmission ECU 62 due to the condition in which the crank angle sensor 13 is broken, or in which a problem occurs in the communication route between the engine ECU 14 and the transmission ECU 62, etc., the rotational speed of the engine 10 can be detected by use of the second sensor 61 (sensor that detects rotation of the second input shaft 37) originally equipped for clutch control.

Consequently, there is no need to preliminarily provide, on the engine 10 side, a sensor for measuring the rotational speed of the engine 10 in addition to, for example, the crank angle sensor 13. As a result, no standby sensor is required, and the overall cost of the automobile can be reduced. That is, the double-clutch transmission 20 can contribute to cost reduction.

In addition, by comparing the engine rotational speed detected on the engine side with the engine rotational speed detected on the transmission side, problems can also be detected with each sensor and detection unit.

Furthermore, even when the crank angle sensor 13 fails and is unable to conduct normal transmission control, the first clutch 38 can be controlled and thus an automobile can be advanced and reversed.

According to the present invention, there is no need to install a sensor dedicated to detection of the engine rotational speed on the transmission side, and thus a double-clutch transmission that can contribute to cost reduction can be provided.

Note that, in the present embodiment, an example of fixing the shift position to the third gear speed under the fail state while the automobile is forward-traveling has been given. The present invention is not limited to this. For example, the shift position may be fixed to the second gear speed. In such event, the first sensor 60 measures the rotational speed of the driven gear 42 and the transmission ECU 62 measures the rotational speed of the first input shaft 34 from the relevant measurement result, and at the same time detects the rotational speed of the engine 10 based on this detection result.

Note that, in the present embodiment, in the fail state while the automobile is forward-traveling, the shift position is fixed to specific gearshift levels. However, since information on the engine rotational speed detected from the rotational speed of the second input shaft and the rotational speed of the first input shaft 34 can be obtained, the connection and disconnection actions of the first clutch are enabled, and gearshift operation in the gearshift level group (first gear speed, third gear speed, fifth gear speed, and reverse) to which motive power is conveyed by the first input shaft 34 can be conducted.

In addition, as one example of the detection unit in the present invention, combination of the first and second sensors 60 and 61 with the transmission ECU 62 is indicated, but the present invention is not limited to this. For example, the rotational speed of the engine 10 may be measured by the first and second sensors 60 and 61 only.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A double-clutch transmission, comprising:

an input system provided with drive gears of a first gearshift level group of a plurality of gearshift levels divided into two groups, a first input shaft to which the drive gears of the first gearshift level group are installed, drive gears of a second gearshift level group, a second input shaft to which the drive gears of the second gearshift level group are installed, a first clutch which conveys the rotational force of an engine to the first input shaft, and a second clutch which conveys the rotational force of the engine to the second input shaft;

an output system provided with driven gears of a first gearshift level group engaged with the drive gears of the first gearshift level group, driven gears of the second gearshift level group engaged with the drive gears of the second gearshift level group, an output shaft unit by which the driven gears of the first gearshift level group and the driven gears of the second gearshift level group are rotatably supported, the output shaft unit including at least one output shaft by which at least one of the drive gears is rotatably supported, a first synchromesh mechanism which is installed to the output shaft unit, and achieves synchronous rotation between the first input shaft and the output shaft unit, and a second synchromesh mechanism which is installed to the output shaft unit, and achieves synchronous rotation between the second input shaft and the output shaft unit;

a first detection unit which measures a rotational speed of the first input shaft; and a second detection unit which measures a rotational speed of the second input shaft, a control unit that connects the clutch of one of the first input shaft and the second input shaft which is not synchronously rotated with the output shaft unit to synchronize the speed of rotation of the one of the first input shaft and the second input shaft with that of the engine, and utilizes the measured rotational speed of the one of the first input shaft and the second input shaft as the engine rotational speed, and selectively controls the clutch of the other of the first input shaft and the second input shaft based on the measured rotational speed of the one of the first input shaft and the second input shaft.

2. The double-clutch transmission according to claim 1, further comprising:

an engine sensor which is installed to the engine and measures the engine rotational speed, wherein the control unit controls the first clutch based on the engine rotational speed measured by the engine sensor and the rotational speed of the first input shaft and controls the second clutch based on the engine rotational speed and the rotational speed of the second input shaft, wherein when the engine sensor fails, the control unit controls the clutch of the other of the first input shaft and the second input shaft which is rotated synchronously with the output shaft unit by use of the measured rotational speed of the one of the first input shaft and the second input shaft which is not rotated synchronously with the output shaft unit.

3. The double-clutch transmission according to claim 2, further comprising:

a driven gear for reverse which rotates synchronously with the drive gear of the first gearshift level group and at the same time rotates the output shaft unit in the reverse direction, wherein when the engine sensor fails, the engine rotational speed is detected by the rotational speed of the second input shaft to thereby enable control of the first clutch.

4. A double-clutch transmission, comprising:

an input system provided with drive gears of a first gearshift level group of a plurality of gearshift levels divided into two groups, a first input shaft to which the drive gears of the first gearshift level group are installed, drive gears of a second gearshift level group, a second input shaft to which the drive gears of the second gearshift level group are installed, a first clutch which conveys the rotational force of an engine to the first input shaft, and a second clutch which conveys the rotational force of the engine to the second input shaft;

an output system provided with driven gears of a first gearshift level group engaged with the drive gears of the first gearshift level group, driven gears of the second gearshift level group engaged with the drive gears of the second gearshift level group, an output shaft unit by which the driven gears of the first gearshift level group and the driven gears of the second gearshift level group are rotatably supported, the output shaft unit including at least one output shaft by which at least one of the drive gears is rotatably supported, a first synchromesh mechanism which is installed to the output shaft unit, and achieves synchronous rotation between the first input shaft and the output shaft unit, and a second synchromesh mechanism which is installed to the output shaft unit, and achieves synchronous rotation between the second input shaft and the output shaft unit;

a first detection unit which measures a rotational speed of the first input shaft;

a second detection unit which measures a rotational speed of the second input shaft;

an engine sensor which is installed to the engine and measures the engine rotational speed; and a control unit for controlling the first clutch based on the engine rotational speed measured by the engine sensor and the rotational speed of the first input shaft and controlling the second clutch based on the engine rotational speed and the rotational speed of the second input shaft, wherein the clutch of one of the first input shaft and the second input shaft which is not synchronously rotated with the output shaft unit is connected to synchronize the speed of rotation of the one of the first input shaft and the second input shaft with that of the engine, and the rotational speed of the one of the first input shaft and the second input shaft is measured to thereby detect the engine rotational speed, and wherein when the engine sensor fails, the clutch of the other of the first input shaft and the second input shaft which is rotated synchronously with the output shaft unit is controlled by use of the engine rotational speed detected by the rotational speed of the one of the first input shaft and the second input shaft which is not rotated synchronously with the output shaft unit.

5. The double-clutch transmission according to claim 4, further comprising:

a driven gear for reverse which rotates synchronously with the drive gear of the first gearshift level group and at the same time rotates the output shaft unit in the reverse direction, wherein when the engine sensor fails, the engine rotational speed is detected by the rotational speed of the second input shaft to thereby enable control of the first clutch.

* * * * *